Figure 1:
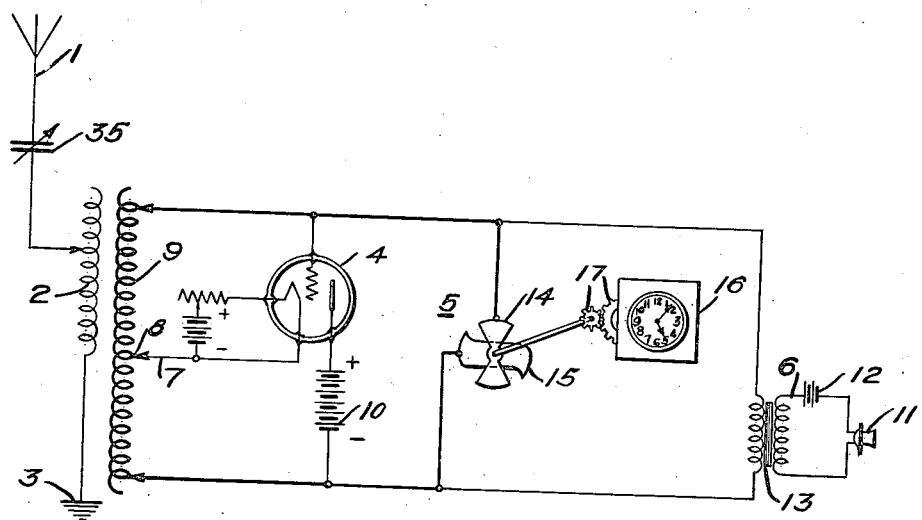

Mar. 3, 1925.

S. A. STAEGE 1,528,032

SELECTIVE SIGNALING SYSTEM

Filed Jan. 14, 1921

WITNESSES:

INVENTOR
Stephen A. Staege
BY
ATTORNEY

Patented Mar. 3, 1925.

1,528,032

UNITED STATES PATENT OFFICE.

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA.

SELECTIVE SIGNALING SYSTEM.

Application filed January 14, 1921. Serial No. 437,180.

*To all whom it may concern:*

Be it known that I, STEPHEN A. STAEGE, a citizen of the United States, and a resident of Pittsburgh, in the county of Allegheny and State of Pennsylvania, have invented a new and useful Improvement in Selective Signaling Systems, of which the following is a specification.

My invention relates to selective systems of communication of the type wherein the messages or signals are transmitted by means of changes in the amplitude of high-frequency carrier waves.

An object of my invention is to devise a system of secret and selective sending and receiving, whereby the carrier wave frequency is caused to vary through a predetermined cycle within certain limits. In order that the receiving station may receive messages sent by a system of the character designated, it is necessary that the tuning of the receiving station shall pass through the same cycle of variation in frequency.

Another object of my invention is to produce a synchronously driven static condenser which is capable of cyclicly varying the frequency of the sending or receiving circuit. The capacity of the condenser determines the total variation in the frequency and wave-length, and the particular shape of the condenser plates determines the characteristics of the cycle of frequency variations. Since an infinite variety of condenser plates might be used, and since the various condenser plates might be operated at any desired speed within certain limits, an almost unlimited combination of frequency variations may be obtained.

Other objects, as well as the nature and scope of my invention, will be apparent from the accompanying description and appended claims.

Figure 2:
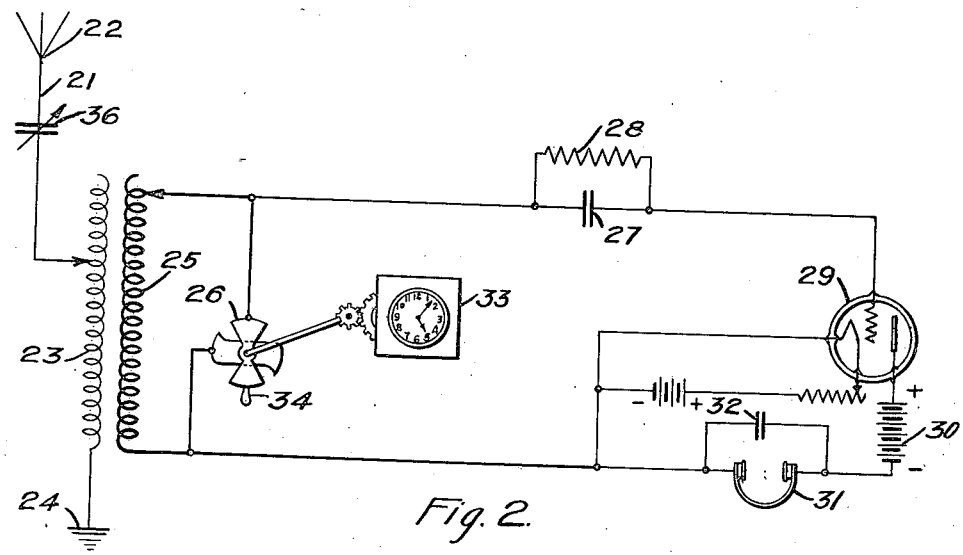

Referring to the drawing for a more complete understanding of my invention,

Figure 1 is a diagrammatic view of circuits and apparatus embodying my invention in a transmitting station, and Fig. 2 is a similar view for a receiving station.

It is to be understood that any suitable transmitting or receiving connection may be employed. In order to explain my invention I have shown a simple form of transmitting and receiving system.

The transmitting station consists of an antenna circuit 1 including a variable inductance coil 2 and a ground connection 3. The oscillation generator is illustrated as being of the electron tube type, including a triode 4, a variable static condenser 5, and a modulating circuit 6.

Referring to the circuit shown in Fig. 1, it will be seen that the negative terminal 7 of the filament is connected to an intermediate tap 8 of a coupling transformer coil 9, which is in inductive relation to the coil 2. One terminal of the coil 9 is connected to the plate of the triode through a plate battery 10. The other terminal of the coil 9 is provided with an adjustable tap which is connected to the grid of the triode.

Tuning is effected by means of the aforementioned static condenser 5, which is connected across the terminals of the coil 9. The modulating circuit 6, comprising a transmitter 11 and battery 12, is connected across the terminals of the condenser 5, by means of the audible-frequency transformer 13. The apparatus and connections thus far described are well-known in the art and form no part of my invention.

According to my invention, I design and operate the tuning condenser 5 in such manner that a cyclic variation in frequency is produced. The condenser 5 is shown as comprising one or more parallel stationary plates 14, and a corresponding number of interleaved rotating plates 15. The plates 14 and 15 may be given any desired shape, in order to produce any desired variation in the periodic change in frequency.

Any suitable means may be provided for rotating the shaft of the variable condenser. I have indicated, by way of illustration, a clock motor 16, which is connected to said shaft through suitable gearing 17.

Having now described the construction of a transmitting station, I will now describe its operation.

The oscillation circuit, which controls the frequency of the oscillations, is composed of the inductance of the coil 9 and the capacitance of the condenser 5. The grid and plate circuits are coupled to the oscillation circuit by means of the self inductances of their respective portions of the coil 9. It is well understood that the above-described circuits may be adjusted to set up oscillations having a frequency which is fixed by the reactances of the oscillation circuit.

When the oscillations are first initiated, their amplitude will increase, by reason of the feed-back arrangement which impresses some of the power from the plate circuit back into the grid circuit, until stable conditions are obtained, which will be determined by the constants of the various circuits. The amplitude of vibration is then changed or modulated by means of the modulating circuit 6 to transmit any desired signal.

Referring now to Fig. 2, I have indicated a simple receiving system. The antenna circuit, designated 21, comprises an antenna 22, a variable coil 23, and a ground connection 24. Tuning is effected by means of a secondary coil 25 and a variable condenser 26. One terminal of the condenser 26 is connected, through a grid condenser 27 and a grid leak 28, to the grid of a triode 29. The other terminal of the variable condenser 26 is connected to the negative terminal of the filament of the triode. The variations in currents in the antenna circuit are amplified in the plate circuit of the triode, which includes the plate battery 30 and the receivers 31. The latter may be shunted, if desired, by means of a small condenser 32, for the purpose of facilitating the passage of radio-frequency currents, as is well known in the art.

In order that the receiving station may receive messages sent out by the transmitting station illustrated in Fig. 1, it is necessary that a rotary static condenser be employed, having the same design as the condenser employed in the sending station and running in absolute synchronism therewith. I have, therefore, illustrated the condenser 26 as being of the rotary type similar to the condenser 5 and similarly driven by means of a clock motor 33.

If desired, the clock motors 16 and 33 may be left continuously running, and discrepancies in the time of the same may be compensated for, through a hand adjustment of the stationary plates of the rotary condenser 26, by means of a handle 34. With the clock motors 16 and 33 running at the same speed, it is a comparatively easy matter for the operator at the receiving station to shift the phase relation backward or forward until he gets into absolute phase with the sending station, at which time his receiving apparatus will be tuned with the sending station throughout the entire cycle of frequency variations.

In operation, the transmitting station is tuned to the desired average wave length, as by means of the variable condenser 35 in the antenna circuit. The rotating condenser 5 will then vary the wave length of the radio-frequency waves within certain prescribed limits, dependent upon the capacity of the rotating condenser, and the wave lengths will have a certain definite cycle of variation, determined by the shape of the condenser plates.

The receiving station may be similarly tuned to the average wave length, as by means of the variable condenser 36 in the antenna circuit. If there is any difference in phase between the rotating condenser 26 at the receiving station and the rotating condenser 5 at the sending station, an adjustment may be readily made by means of the handle 34 in order that the received signals may be as strong as possible. It is of course understood that, if necessary, adjustable reactive means may be used in conjunction with the rotating condenser in order to change the amount of frequency variation in the radio waves.

It is understood, of course, that my invention is also applicable to synchronous-motor-driving means for the rotating condensers 5 and 26, or to any other suitable synchronizing means for operating the same.

It is apparent that messages sent out by my transmitting station may be received only by receiving stations which are provided with rotating condensers having the proper shape and capacity and rotated at the proper speed. Moreover, a plurality of stations may be transmitting messages simultaneously by means of similar systems, having the same average wave-length, but having frequency variations of different characteristics. The only possible interference from the other stations would be slight clicks at the times the various waves crossed, and the clicks could be eliminated by employing apparatus having a sufficient degree of selectivity.

In the case where a high-frequency generator is used for the sending station, the same principle of varying the frequency may be employed by varying the speed of the generator through mechanical means. It is therefore desired that my invention shall be understood as covering any suitable form of oscillation generator.

It is also to be understood that any suitable means may be employed for varying the radio frequency or wave lengths, such as a rotating variometer in place of the rotating condenser, although the latter is far preferable for most purposes.

From the foregoing description, it will be apparent that I have provided means for secret communication, either by wire telephony or telegraphy or by space telephony or telegraphy. It will also be evident that I have devised a system making it possible to send messages simultaneously, from a great number of stations, all having the same average wave length, if desired, without serious interference.

I claim as my invention:

1. In a secrecy selective signaling system, the combination of a transmitting station having an oscillation generator of the type in which the frequency of the oscillations may be varied by the adjustment of a reactance device, and a static condenser having stationary plates of one polarity and rotating plates of the opposite polarity connected to alter said reactance, said condenser having a plate-shape to vary the frequency of said oscillations in accordance with a predetermined cycle, and a receiving station having a similar rotating condenser for keeping said receiving station in tune, at all times, with said oscillations and means for adjusting the position of the stationary plates of the condenser at the receiving station.

2. In a secret radio signaling system, tuning reactances at the sending and receiving stations, each tuning reactance comprising a stationary and a cyclicly moving part, means for driving the said moving parts at substantially the same frequency and means at the receiving station for adjusting the stationary part of the tuning reactance to thereby adjust the phase of the tuning cycle.

In testimony whereof, I have hereunto subscribed my name this 5th day of January 1921.

STEPHEN A. STAEGE.